United States Patent
Steinhauer et al.

(10) Patent No.: US 8,644,966 B2
(45) Date of Patent: Feb. 4, 2014

(54) APPARATUS AND METHOD FOR PROJECTING FIELD DEVICES OF A TECHNICAL SYSTEM

(75) Inventors: Guido Steinhauer, Büchelberg (DE); Michael Unkelbach, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 538 days.

(21) Appl. No.: 12/919,900

(22) PCT Filed: Feb. 23, 2009

(86) PCT No.: PCT/EP2009/052098
§ 371 (c)(1),
(2), (4) Date: Dec. 7, 2010

(87) PCT Pub. No.: WO2009/106495
PCT Pub. Date: Sep. 3, 2009

(65) Prior Publication Data
US 2011/0071655 A1    Mar. 24, 2011

(30) Foreign Application Priority Data

Feb. 29, 2008 (EP) .................................. 08003818

(51) Int. Cl.
*G05B 11/01* (2006.01)
*G05B 15/00* (2006.01)

(52) U.S. Cl.
USPC .................. 700/83; 700/17; 700/18; 700/19; 700/20

(58) Field of Classification Search
None
See application file for complete search history.

(56) References Cited

U.S. PATENT DOCUMENTS

| 6,907,771 | B2* | 6/2005 | Finlay et al. | 73/40.7 |
| 7,272,531 | B2* | 9/2007 | Kavaklioglu et al. | 702/182 |
| 7,557,702 | B2* | 7/2009 | Eryurek et al. | 340/511 |

FOREIGN PATENT DOCUMENTS

DE 19639424 A1 3/1997
WO WO 2005109122 A1 11/2005

OTHER PUBLICATIONS

T.S. Sidhu, "Control and Automation of Power System Substation using IEC61850 Communication", Control Applications, 2005, CCA 2005, Proceedings of 2005, IEEE Conference on Toronto, Aug. 29-31, 2005, pp. 1331-1336, XP010835276.
Renhui Dou, Jie Ding, Yefei Zhou, "The Data-View Model of IEC 61850 Server", Power System Technology, 2006, Powercon. 2006, International Conference on IEEE, PI, Oct. 1, 2006, pp. 1-4, XP031053311.
Gwan-Su Kim, Hong-Hee Lee, "A Study on IEC 61850 based Communication for Intelligent Electronic Devices", Science and Technology, 2005, Korus 2005 Proceedings, the 9th Russian Jun. 26, 2005; Jun. 26, 2005-Jul. 2, 2005, Jun. 26, 2005, pp. 765-770, XP010837120.
C. Hoga and G. Wong, "IEC 61850: Open Communication in Practice in Substations", Power Systems Conference and Exposition, 2004, pp. 1531-1536, XP010787994.

(Continued)

*Primary Examiner* — Ronald Hartman, Jr.

(57) ABSTRACT

A device and a method for projecting field devices of a technical system, in particular a power plant system, into a control system of the technical system are provided. The device includes means for a computer-implemented display of two field devices as two data objects and means for a computer-implemented display of a connection between the two data objects of the two field devices.

12 Claims, 2 Drawing Sheets

(56) References Cited

OTHER PUBLICATIONS

Klaus-Peter Brand, "The Standard IEC 61850 as Prerequisite for Intelligent Applications in Substations", Power Engineering Society General Meeting, 2004, pp. 714-718; XP 010756486.

John B. Weber, "Applying Visual Basic for Human Machine Interface Applications", Internet Citation, http://www.softwaretoolbox.com/ims99/swtoolboxims99final.pdf, Sep. 26, 1999, pp. 1-13.

Wan Bo: "Study of Substation Automation System Architecture Based on IEC61850, China's Excellent Doctor and Master Degree Pater Full-text Database (Master) Engineering Science", vol. II, pp. 1-89, Dec. 15, 2003.

Communication From Chinese Patent Office, Mar. 30, 2012, pp. 1-10.

* cited by examiner

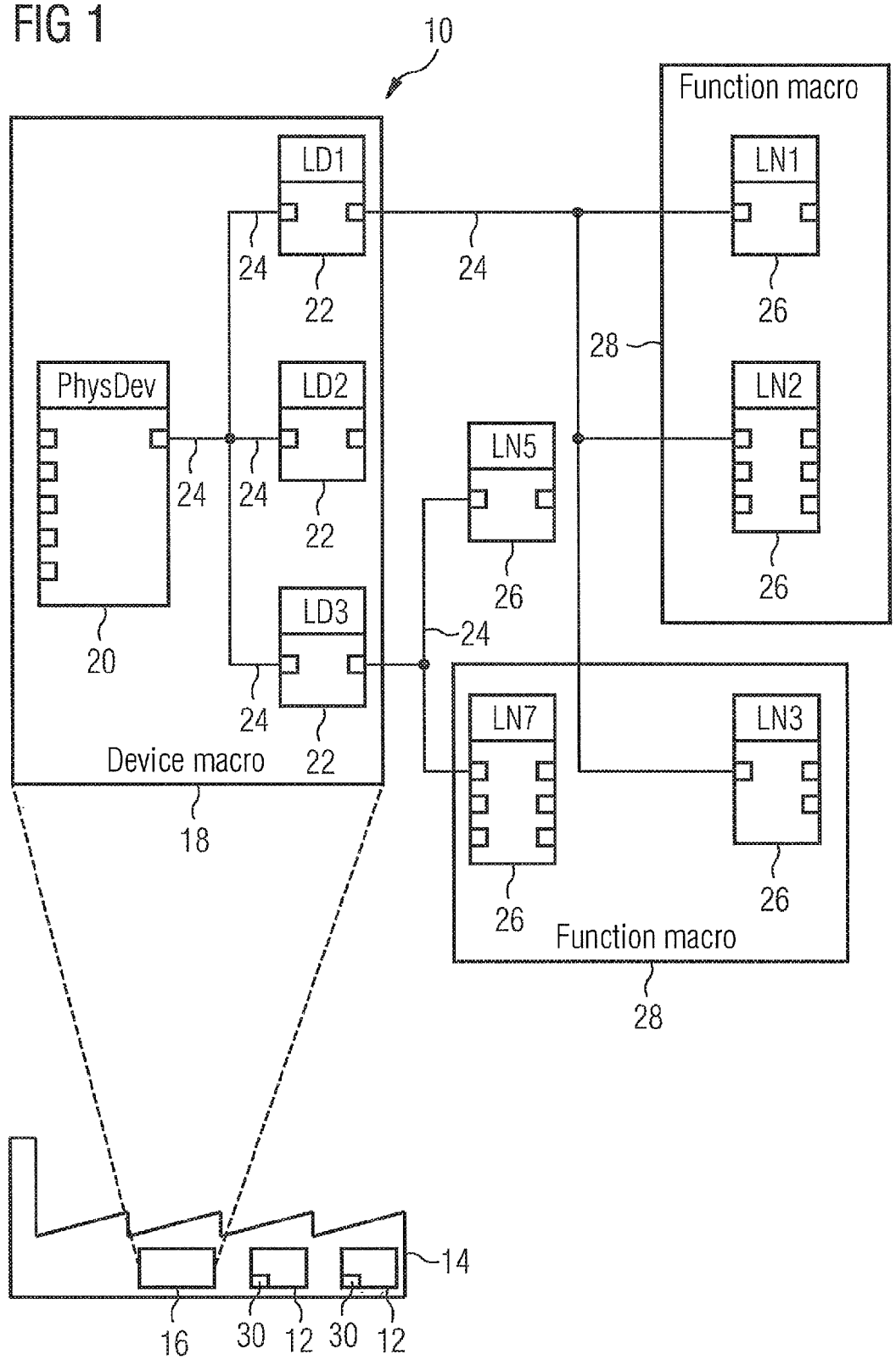

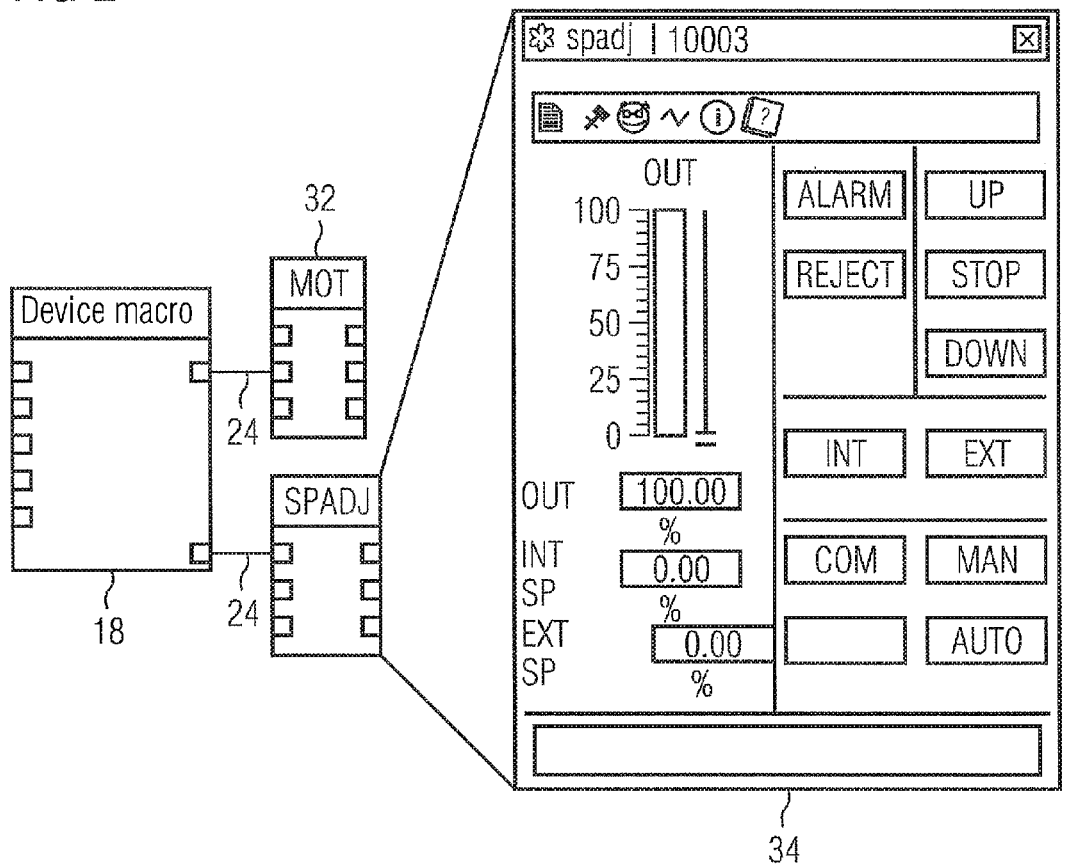

APPARATUS AND METHOD FOR PROJECTING FIELD DEVICES OF A TECHNICAL SYSTEM

CROSS REFERENCE TO RELATED APPLICATIONS

This application is the US National Stage of International Application No. PCT/EP2009/052098 filed Feb. 23, 2009, and claims the benefit thereof. The International Application claims the benefits of European Application No. 08003818.5 EP filed Feb. 29, 2008. All of the applications are incorporated by reference herein in their entirety.

FIELD OF INVENTION

The invention relates to an apparatus and method for projecting field devices of a technical system, especially a power plant system for energy generation, such as a steam turbine or gas turbine system for example.

BACKGROUND OF INVENTION

With known power plant systems all functions of the individual components of the power plant system are under the overall control of a control system. In such cases it is necessary to operationally connect to the control system what are known as field devices, with which monitoring and safety functions for the individual components of the power plant are implemented in particular.

These types of field devices are for example the measuring devices of a transformer controller, a device protecting a transformer against overvoltage or maybe a motor protection against overvoltage.

To functionally connect such field devices to the control system tools or programming facilities are now available which are generally provided by the suppliers of the individual field devices and make it possible in a tabular user interface to plan the functional connection of the field device to the control system and the connections between the field devices into a project. The manner in which such tools are operated is however greatly dependent on the respective tool provided, on the type of field device and also on its supplier.

The functional linkage of field devices into such technical plants is thus comparatively costly and demands intensive training. Furthermore a connection created in such a way is always designed very individually and as a rule is not able to be linked into the actual control system of the power plant. Instead the field device planned into the project in this way represents a self-contained control and regulation module which is located functionally outside the control system and can accordingly not be fully monitored, evaluated and checked for errors by the latter.

SUMMARY OF INVENTION

An object of the present invention is to provide an apparatus and a method for planning field devices of a technical system, especially a power plant, into a project, in which the above-mentioned disadvantages can be overcome and especially in which a simple and cost-effective functional inclusion of the field devices into the associated technical system is possible.

The object is achieved with an apparatus and a method according to the independent claims. Advantageous developments of the invention are described in the dependent claims.

In accordance with the invention an apparatus and a method for projecting field devices of a technical system, especially of a power plant, into a control system of the technical system are provided, in which a means is used for computer-implemented display of at least two field devices as at least one data object in each case and furthermore a means is used for computer-implemented display of at least one connection between the two field devices.

The inventive solution thus provides a fundamental system by means of which the almost arbitrary field devices can be functionally linked into a technical system in a structurally-identical manner and therefore in a manner which is easy to learn for any user of the inventive apparatus.

The means for computer-implemented display of at least two field devices as at least one data object in each case is especially preferably a graphical display device on which, by means of a corresponding (advantageously likewise graphical) operating device, a computer-implemented display of the individual field device is shown as a graphical object or as a symbol. The connections which are inventively provided as a computer-implemented display between the data objects and/or also the control system are preferably visualized on this type of graphical display device by means of a connecting line.

Preferably the means for computer-implemented display of at least two field devices as at least one data object in each case, as well as the corresponding inventive method step, are adapted for computer-implemented display of the individual field device as at least one logical node of a standardized field bus protocol, especially in accordance with IEC61850. Through the logical nodes predetermined in this type of field bus protocol, function modules (such as a measurement device for example) of the respective field device are shown in a computer-implemented display as logical nodes. In such cases the individual function modules are especially mapped by corresponding inputs and/or outputs. Communication between the individual function modules and/or between different field devices is preferably also planned into the project as a connection in the form of a connecting line.

Inventively preferably a number of field devices can also be grouped (especially by means of a graphical operating device) to form a logical device and/or a number of functional modules can be grouped to form a field device. These types of groupings (which are also referred to here as macro technique) inventively enable almost any given types and forms of field device and logical device to be shown in a computer-implemented display and accordingly linked into a control system of a power plant. Accordingly computer-implemented display of almost any given actually existing field devices or physical devices is possible in this manner.

For further simplification of the inventively-created projecting of field devices of a technical plant into its control system, it is further preferred that raw data objects be provided from a memory, especially a memory of the plant control system, which represent individual function modules and/or field devices and/or logical devices and can be subsequently expanded in the actual project planning of the field devices by filling out and expanding the raw data object with real values (which are present in specific cases) into a fully projected field device. This type of the expansion is simpler and more cost-effective than a completely new generation of a field device.

Computer-implemented display of the above-mentioned connections between the data object and the control system, and also between the individual data objects of the explained macro technique, is inventively preferably shown as a computer-implemented display as a different connection type from the actual control system. In this way an inventively connected "external" field device can be identified by the control system as such and accordingly monitored and/or addressed specifically if required. Alternately connections between field devices can be differentiated by interpretation from those within the control system or to and from the control system.

The inventively projected field devices can preferably be loaded directly by the control system of the technical system or can be provided by a file export (especially defined in standardized field bus protocols). So-called XML files are preferably used as the data format for such file export. These types of files can currently already be imported into known field devices to functionally link the latter in their turn to a control system. The computer-implemented display of field devices or their functional modules as at least one data object can also be stored together with the inventively computer-implemented display of connections between the data objects as a file and accordingly be provided in almost any way to technical systems.

The inventive solution especially makes possible a uniform projecting of even the most diverse field devices and also advantageously makes available a uniform configuration option, especially in the form of a graphical user interface. The integration of inventively projected field devices into a control system is especially simple and cost-effective. It can additionally also be completely executed such that in the control system almost all functions of the field device are also actually mapped and are recognizable for a user of the control system. The macro technique explained above allows computer-implemented display of field devices of almost any constitution and at the same time allows the user to inspect them in an easy-to-understand way.

BRIEF DESCRIPTION OF THE DRAWINGS

An exemplary embodiment of an inventive apparatus and a method for projecting field devices of a technical system is explained in greater detail below with reference to the enclosed schematic drawings.

FIG. 1 shows a first, greatly simplified diagram of an exemplary embodiment of an inventive apparatus for projecting field devices and FIG. 2 shows a second, greatly simplified diagram of the apparatus according to FIG. 1.

DETAILED DESCRIPTION OF INVENTION

FIG. 1 illustrates an apparatus 10 for planning field devices 12 into a project in the shape of transformer protection in each case of a technical system 14 in the form of a power plant. The apparatus 10 is implemented in a control system 16 of the technical system 14.

The apparatus 10 in this case comprises a graphical user interface with a device macro 18 which is made up of a physical device 20 (PhysDev) and three logical devices 22 (LD1, LD2, LD3). The physical device 20 is functionally coupled via connections 24 to the logical devices 22.

At two of the logical devices 22 coupling to logical nodes 26 (LN1, LN2, LN3, LN5, LN7) is established via connections 24, of which individual nodes are grouped into function macros (28) (one function macro in each case).

The individual logical nodes 26 in this case are projected based on a raw data object (not shown in any greater detail), in that the respective raw data object previously stored in the control system 16 has been assigned real values of the technical system 14. The data objects shown in this way in a computer-implemented display in the form of logical nodes 26 have subsequently undergone computer-implemented functional coupling with the aid of the apparatus 10 by means of connections 24. In this way the functionalities of the field devices 12 and their communication between their inputs and/or outputs have been mapped. Thus for example a measurement device 30 at the field device 12 in the form of a voltage meter has been functionally mapped with a logical node 26.

The computer-implemented mapping or display of the individual said macros occurs in this case within the control system 16 at the graphical user interface, especially in the form of a screen mask, with graphical symbols. In this case an XML file is generated for the device macro 18 which presents a structured overview of the individual data objects of the computer-implemented display of field devices 12 and the computer-implemented display of the connections between said devices.

FIG. 2 illustrates how field devices 12 planned into a project in this way are operated within the technical system 14 and the associated control system 16 during operation of the technical system 14 and are illustrated for the system operator.

FIG. 2 shows the device macro 18 stored in the control system 16 in the form of the said XML file, which will be processed by the control system 16. Assigned to the device macro 18 in this case via connections 24 are an interface 32 (MOT) to the actual field device 12 and also a graphical display and adjustment device 34 (SPADJ—Setpoint Adjuster).

The setpoint adjuster 34 includes graphical displays and also numerical displays of individual physical variables at the associated field device 12 as well as input fields, especially for limit values at the field device 12. The setpoint adjuster 34 can be presented for display to an operator of the technical system at the control system 16 and especially at an operating computer of this control system 16. In this case the operator can also change individual values of the said variables at the setpoint adjuster 34.

Planning field devices 12 into a project with the aid of the apparatus 10 and the logical structure used in such planning by means of the elements 18, 20, 22, 24, 26 and 28 is thus undertaken solely through a graphical, symbol-oriented projecting apparatus, as is illustrated in FIGS. 1 and 2. The projecting uses the symbols and standards as described in the field bus protocol in accordance with IEC61850. This creates an inherently consistent projecting structure which also simplifies the linking-in of the data objects connected in this way into the overall control system 16 during projecting. Furthermore a specific connection type is assigned to the individual connections 24 during projecting where necessary, so that the control system 16 can distinguish these connections 24 from internal connections of the control system. The said XML file can either be loaded directly into the control system 16 or can be imported into the associated field device 12. This loading and/or the actual operation of the field devices 12 can especially preferably be remotely controlled by the control system 16.

The structuring illustrated in FIG. 1 of the of the field devices 12 planned into the project macros in particular makes for improved clarity and simplified projecting. This is possible in an especially simple manner by functional modules of the field devices 12 (such as the measurement device 30 for example) being mapped by corresponding inputs and/or outputs by the logical node 26 predetermined by the standard or the field bus protocol IEC61850. Furthermore the communication between different field devices 12 is planned into the project by the said connections 24 or the connecting lines shown in accordance with the field bus protocol IEC61850. By using the said macro technique the individual logical nodes 26 can then be grouped again to the said physical device 20, so that the operator has a good overview within the control system 16 of the linking-in of the field devices 12 into the control system 16. In this technique a uniform configuration interface is used with the apparatus 10 which is especially integrated into the control system 16.

Projecting is undertaken solely by means of function modules which are connected to each other with their inputs or outputs as individual data objects. No device-specific programming knowledge is required in such cases.

The apparatus 10 also ensures comprehensive documentation of the technical systems 14 and of the field devices 12 coupled to them.

The invention claimed is:

1. A device for projecting field devices of a technical system into a control system of the technical system, comprising:
    means for a computer-implemented display of two field devices as two data objects; and
    means for a computer-implemented display of a connection between the two data objects of the two field devices,
    wherein raw data objects are provided by a memory of a control system which represent individual function modules and/or field devices and/or logical devices,
    wherein the means for the computer-implemented display is configured to load the raw data objects into the computer-implemented display from the memory, and
    wherein the raw data objects are expanded during projecting of the two field devices.

2. The device as claimed in claim 1, wherein the technical system is a power plant system.

3. The device as claimed in claim 1, wherein the means for the computer-implemented display of the two field devices as two data objects is configured for a computer-implemented display of each individual field device as a logical node of a standardized field bus protocol.

4. The device as claimed in claim 3, wherein the standardized field bus protocol is in accordance with IEC61850.

5. The device as claimed in claim 1, wherein the means for the computer-implemented display of the two field devices as two data objects is configured to group a plurality of field devices into one logical device.

6. The device as claimed in claim 1, wherein the means for the computer-implemented display of the connection between the two data objects is configured to display the connection as a connection type different from a connection type of the control system.

7. A method of projecting field devices of a technical system into a control system of the technical system, comprising:
    providing a display;
    computer-implemented displaying two field devices as two data objects; and
    computer-implemented displaying a connection between the two data objects of the two field devices,
    providing raw data objects by a memory of a control system which represent individual function modules and/or the two field devices and/or logical devices,
    loading the raw data objects into the display from the memory during the computer-implemented displaying, and
    expanding the raw data objects during projecting of the two field devices.

8. The method as claimed in claim 7, wherein the technical system is a power plant system.

9. The method as claimed in claim 8, wherein each individual field device is presented as a logical node of a standardized field bus protocol.

10. The method as claimed in claim 9, wherein the standardized field bus protocol is in accordance with IEC61850.

11. The method as claimed in claim 7, wherein a plurality of field devices is grouped together to form one logical device.

12. The method as claimed in claim 7, wherein the connection is shown as a connection type differing from a connection type of the control system.

\* \* \* \* \*